(12) United States Patent
Krauskopf et al.

(10) Patent No.: US 8,116,901 B2
(45) Date of Patent: Feb. 14, 2012

(54) METHOD AND DEVICE FOR CONTROLLING A MOTION SEQUENCE OF A MACHINE ELEMENT

(75) Inventors: Sebastian Krauskopf, Gemuenden (DE); Bartosz Korajda, Lohr (DE)

(73) Assignee: Robert Bosch GmbH, Stuttgart (DE)

( * ) Notice: Subject to any disclaimer, the term of this patent is extended or adjusted under 35 U.S.C. 154(b) by 631 days.

(21) Appl. No.: 12/263,795

(22) Filed: Nov. 3, 2008

(65) Prior Publication Data

US 2009/0118840 A1    May 7, 2009

(30) Foreign Application Priority Data

Nov. 6, 2007  (DE) .......................... 10 2007 053 216

(51) Int. Cl.
*G06F 19/00* (2011.01)
(52) U.S. Cl. ........... 700/189; 700/29; 708/290; 318/573
(58) Field of Classification Search .................... 700/29, 700/189; 708/290; 318/573
See application file for complete search history.

(56) References Cited

U.S. PATENT DOCUMENTS

| | | | |
|---|---|---|---|
| 6,701,210 B2 * | 3/2004 | Heber et al. | ................... 700/189 |
| 2006/0167570 A1 | 7/2006 | Francis | |

FOREIGN PATENT DOCUMENTS

| | | |
|---|---|---|
| DE | 100 27 864 | 12/2000 |
| DE | 100 65 422 | 7/2002 |
| WO | 2006/102517 | 9/2006 |

* cited by examiner

*Primary Examiner* — Kakali Chaki
*Assistant Examiner* — Sheela S Rao
(74) *Attorney, Agent, or Firm* — Michael J. Striker

(57) ABSTRACT

For controlling a motion sequence of a machine element, with which the control of the motion sequence of the machine element is carried out based on a functional relationship between a master shaft and a slave shaft, the functional relationship IS ascertained with consideration for several conditions of this motion sequence. The functional relationship includes at least one first section, which is defined by an nth-order polynomial, and at least one second section, which is at least partially separated from the first section, and which is defined by an ath-order polynomial. In this case, "a" is less than "n".

18 Claims, 2 Drawing Sheets

1

METHOD AND DEVICE FOR CONTROLLING A MOTION SEQUENCE OF A MACHINE ELEMENT

CROSS-REFERENCE TO A RELATED APPLICATION

The invention described and claimed hereinbelow is also described in German Patent Application DE 10 2007 053 216.6 filed on Nov. 6, 2007. This German Patent Application, whose subject matter is incorporated here by reference, provides the basis for a claim of priority of invention under 35 U.S.C. 119(a)-(d).

BACKGROUND OF THE INVENTION

The present invention relates to a method and a device for controlling a motion sequence of a machine element. Many branches of industry, e.g., the packaging industry or the textile industry, use manufacturing machines that often include a large number of movable machine elements, the motions of which are precisely coordinated with one another. In modern systems, it is common to control the motion sequences of these individual machine processes using processors or control devices, the motion sequences to be carried out being programmed in these control devices.

For instance, position values of a master element and/or a master shaft, and the position data for a slave element and/or a slave shaft assigned thereto, may be stored in a control device.

The method according to the present invention may be used, e.g., in packaging machines, printing presses, textile machines, and automation systems. It would also be possible to use the method in systems that are controlled electrically, hydraulically, and pneumatically. The present invention may also be used in other systems in which the motion of several machine elements are to be coordinated with one another. In this coordination process, it is often necessary to also consider basic conditions in the section in which the motion is carried out, i.e., an initial speed and an end speed, a starting position and an end position, and an initial and final acceleration must be taken into consideration in particular. In the related art, functional relationships in the form of higher-order polynomials are typically used to control these motion sequences exactly. With the aid of these polynomials, a master shaft position is related to the assigned slave-shaft position.

By using these polynomials, e.g., fifth-order polynomials, the relationship may be defined, in particular with consideration for the basic conditions described above. Cases may occur, however, in particular when unfavorable, normalized boundary values for speed are involved, in which the polynomial "overshoots", that is, e.g., the position of the machine element to be controlled slides into the negative range and/or a backward motion takes place. Backward motions of this type are fatal in many industries, e.g., the printing industry, and are therefore unacceptable.

US 2006/0167570 A1 describes a method for the rapid control of a process variable without overshoot, with which a polynomial function is used and feedback is taken into consideration. A controller is therefore disclosed in this publication, it being necessary to always use the data from an appropriate sensor in the control process.

SUMMARY OF THE INVENTION

The present invention is therefore based on the object of effecting a control of a machine element, with which an overshoot and/or the assumption of negative values in a motion sequence are/is effectively prevented. In other words, the aim is to also prevent the higher-order polynomial from overshooting in the presence of unfavorable, normalized boundary values for speed. As stated above, this behavior is undesired in many applications, e.g., when it is necessary to remain within displacement limits, or when the mechanical design does not permit the resultant motion to take place.

With the method according to the present invention for controlling a motion sequence of a machine element, the control of the motion sequence of the machine element is carried out based on a functional relationship between a master shaft and a slave shaft, the functional relationship being ascertained with consideration for several conditions of this motion sequence. According to the present invention, the functional relationship includes at least one first section, which is defined by an nth-order polynomial, and at least one second section, which is separated entirely from the first section, and which is defined by an ath-order polynomial, "a" being less than "n".

The machine element may be any movable body, e.g., a rotatable shaft, a reciprocating element, or, in general, an element that performs a linear motion.

According to the present invention, therefore, the functional relationship is defined in sections in order to describe the motion sequence. Polynomials of different orders are used for the definitions. By using the ath-order polynomial for the second section, the range that would otherwise overshoot may be compensated for in particular. By using this process of defining in sections, it is possible to design the entire motion sequence without any overshoots. The first section and the second section are preferably entirely separated from one another.

In a further embodiment according to the present invention, an nth-order polynomial that describes the functional relationship is ascertained initially, then an inverse function of this nth-order polynomial is used to describe the functional relationship.

Preferably, in order to ascertain the nth-order polynomial, at least a few of the boundary values and/or basic conditions are modified and, in particular, they are inverted. Particularly preferably, the boundary values for the normalized speeds—i.e., for the slopes, mathematically speaking—are inverted. By inverting the boundary values in this manner, it is possible to initially use the inverse boundary values as the basis for determining the polynomial. When the inverse function is subsequently defined, its boundary values agree with the original speed values.

This second design is suitable for use, in particular, in the case in which high initial speeds and high end speeds of the machine element to be controlled exist. Via this inverse function, it is possible to still respect the boundary values and prevent excessive overshoot. This is explained exactly with reference to the figures.

It would basically also be possible to partially superpose the two sections and to emphasize them, e.g., using different weighting. Preferably, however, the two sections are separated completely, as stated above. It should be noted that it would also be possible to determine only one section and to weight the nth-order polynomial and the ath-order polynomial differently in different regions of this section.

In the preferred method, the functional relationship in the first section is defined by an nth-order polynomial, with n being greater than or equal to 5. Therefore, at least one polynomial of the fifth order or a higher order is used, and, particularly preferably, a fifth-order polynomial is used. Fifth-order polynomials are particularly well-suited for use to describe motion sequences of this type, since they ensure a high level of freedom from jerk, and they are capable of processing several basic conditions, e.g., six basic conditions.

In a further preferred method, a normalized initial speed and a normalized final speed of the machine element have the same mathematical signs.

The movement strategy presented here is not always suitable for use with combinations in which the normalized initial speed and a normalized final speed have different signs. In this case, the trajectory would have a kink at a boundary point if one would request that the trajectory not be allowed to leave a specified normalized range.

The second section is preferably defined by a straight shape, i.e., a polynomial of the zeroth or first order. More accurately stated, in this preferred method, a straight section is inserted before or after the higher-order polynomial.

In a further preferred method, the functional relationship to the entire motion sequence—exactly to one first section and exactly to one second section—is defined. This means that the straight section described above, together with the polynomial, represents the entire motion sequence. It would also be possible, however, to provide more than two sections, e.g., two polynomials with a straight section between them.

In a further preferred method, values for basic conditions of the motion sequence are ascertained, these values are compared with one another, and the sequence between the sections is defined in response to a result of this comparison.

It is possible, e.g., to ascertain the initial speed and final speed, to make a distinction, and, as a consequence of this distinction, to select whether a straight section is to be used before or after the polynomial, or whether to create an inverse function.

In a further preferred method, these basic conditions are the speeds of the machine element at the beginning and end of the particular section. It would also be possible to use the accelerations of the machine element as the basic conditions.

In a further preferred method, a transition point at which the sections transition into one another is defined depending on these basic conditions. If, e.g., a straight section is inserted before a polynomial, a transition from the straight section into the polynomial will take place from a certain point onward. This transition point, in turn, is determined based on the particular basic conditions.

The present invention is also directed to a device for controlling a motion sequence of a machine element, the device including a processor device that controls the motion sequence of the machine element based on a functional relationship between a master shaft and a slave shaft, the processor device determining the functional relationship with consideration for several conditions of this motion sequence. According to the present invention, this functional relationship includes at least one first section, which is defined by an nth-order polynomial, and at least one second section, which is at least partially separated from the first section, and which is defined by an ath-order polynomial, "a" being less than "n".

In a further device according to the present invention, the processor device is designed such that it initially changes at least a few of the boundary values, then determines a polynomial function based on the modified boundary values, and, finally, creates an inverse function for this polynomial function. Preferably, the processor device inverts the boundary values described above. It should be pointed out that several processor devices may also be provided, in which individual steps used to create the functional relationship take place.

With the control according to the present invention, the motion sequence is therefore also formed by a sequence of two sections, which are composed of polynomials of different orders.

DESCRIPTION OF THE PREFERRED EMBODIMENTS

Figure 1:
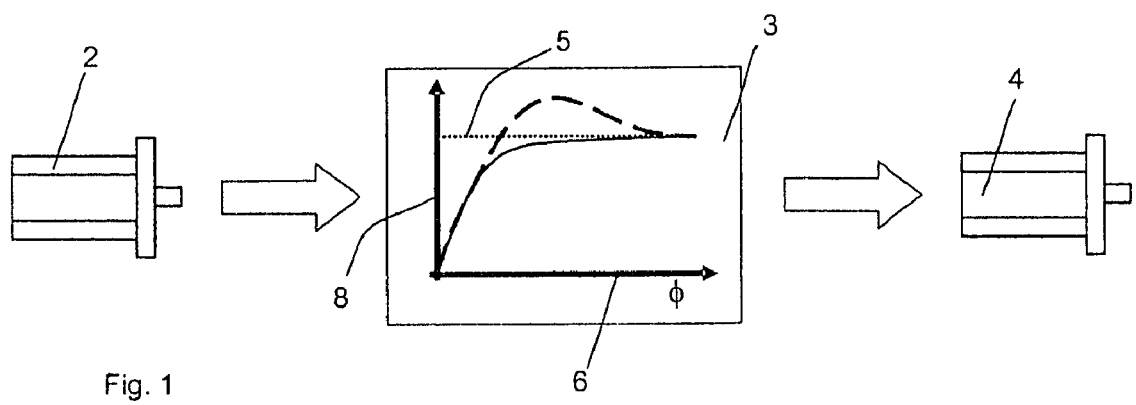
FIG. 1 is a schematic depiction of a control system according to the present invention.

FIG. 1 is a depiction of a method according to the present invention. A master shaft 2 and a slave shaft 4 are shown. The motion of slave shaft 4 is depicted based on location data of master shaft 2 using a graphically depicted, functional relationship 3 with the motion of slave shaft 4. The angle or position of the master shaft is plotted on x-axis 6, and the corresponding position of the slave shaft is plotted on y-axis 8. The dotted horizontal line represents a limiting value that is not to be exceeded during the motion. It is clear that the dashed line—according to the related art—overshoots horizontal line 5, while no overshoots occur with the solid line.

Figure 2:
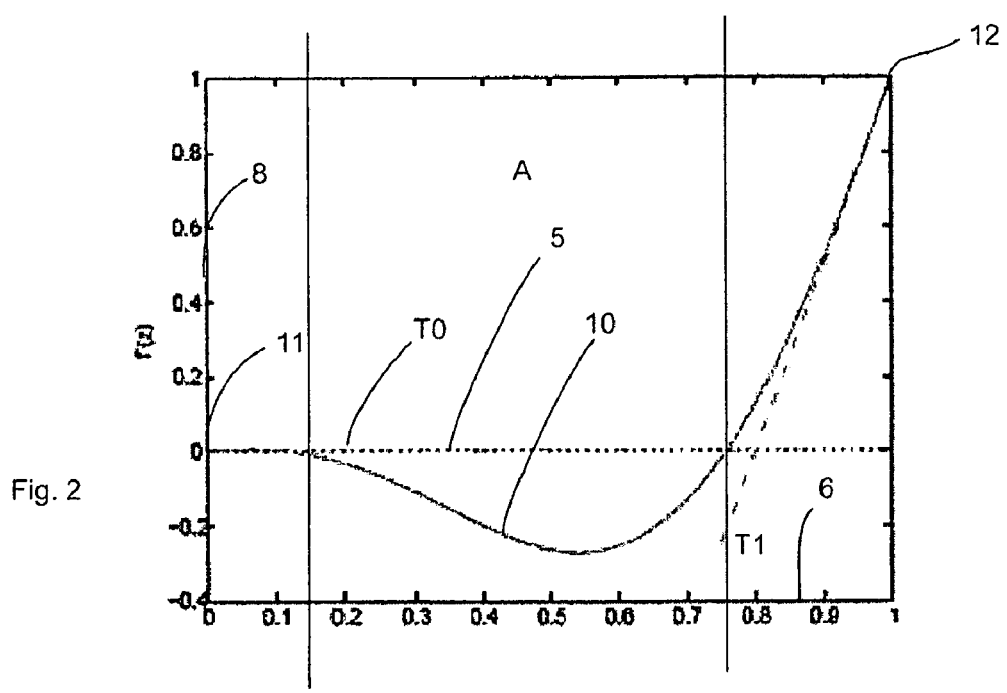
FIG. 2 shows a polynomial used for control, according to the related art.

A depiction of a function according to the related art is shown in FIG. 2. FIG. 2 shows the case in which the initial speed is low, e.g., normalized speed $v_0$ is 0.1, and final speed $v_1$ is high, and is 5 in this case. Since position and angle values are plotted against one another in the graphical depiction in FIG. 2, particular speed $v_0$ or $v_1$ results from the slopes of the graph, that is, tangents T0 and T1.

To ascertain the functional relationship, the particular boundary values for the position, speed, and acceleration at boundary points 11 and 12 are taken into consideration as conditions, and a fifth-order polynomial is created accordingly, which has the appearance shown in FIG. 1. In FIG. 2, it is shown that the polynomial overshoots into the negative range due to the high normalized final speed $v_1$. Dotted line 5 represents the limits of the normalized range in this case as well. A high normalized final speed results not only for a high final speed of the movement step, but also when the master shaft section of the step is selected to be large in relation to the reciprocating section, i.e., the slave shaft section. Reference numeral T0 represents the slope at point 11, and reference numeral T1 represents the slope and/or speed at point 12.

The purpose of the method according to the present invention and/or the movement strategy depicted here is to detect this possible overshoot and to change it by modifying trajectory 10. The manner in which this change is carried out depends on the combination of normalized boundary values for speed. In a preferred method, a distinction is made between four different cases. In every case, normalized initial speed $v_0$ and normalized final speed $v_1$ have the same sign. As mentioned above, this movement strategy may not be used when the normalized initial speed and normalized final speed $v_1$ have different signs. This would mean that the trajectory would have a kink at a boundary point if it would not be allowed to leave the normalized range between $0 \leq x \leq 1$ and, simultaneously, $0 \leq f(x) \leq 1$.

Figure 3:
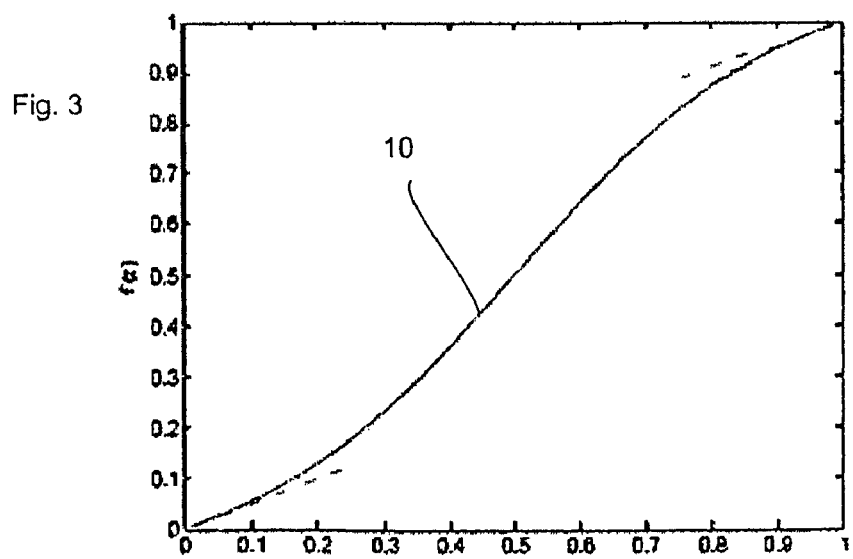
FIG. 3 shows a functional relationship for a further group of basic conditions.

In a first case, the distinction mentioned above is normalized speed $v_0$ and normalized speed $v_1$ is $\leq 1$. With these combinations of boundary values, it may be assumed that the polynomial does not overshoot, so the polynomial may be calculated using known formulas. FIG. 3 shows an example of a non-critical profile shape 10 of this type.

Figure 4:
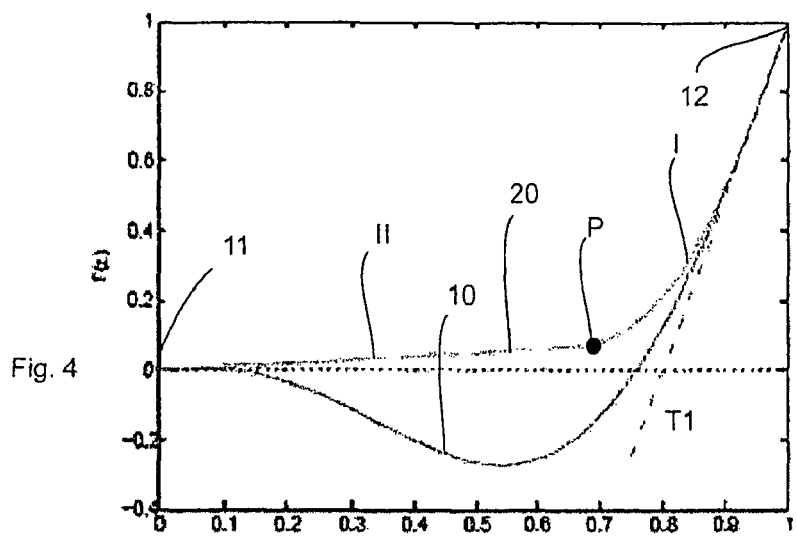
FIG. 4 shows a graph of a function defined in sections, according to the present invention.

A further case is shown in FIG. 4. In this case, initial speed $v_0$ is $\leq 1$ and final speed $v_1$ is $>1$. In other words, a high end speed and a low initial speed exist here. Overshoot may occur in this case, as shown in FIG. 2. This is prevented, however, by inserting a straight section II in front of polynomial I. The slope of this straight piece preferably corresponds to normalized speed $v_0$. In this manner, the normalized boundary values of polynomial I—which has therefore been reduced in size—are modified such that there is no inflection point and, therefore, overshooting into the negative range does not occur, as shown in FIG. 4. Reference numeral 20 labels the motion function, which is composed of sections I and II.

In the depiction shown in FIG. 4 as well, initial speed $v_0$=0.1 and final speed $v_1$=5. Boundary point P between the two sections I and II, and/or coordinates x1 and y1 of this boundary point P are calculated based on the relationships indicated below.

$$v_x = \left(\frac{1}{5}(v_0(2+k) + v_1(3-k))\right) \quad (1)$$

$$x_1 = 1 - \frac{1 - v_0}{v_x - v_0} \quad (2)$$

$$y_1 = 1 - (1 - x_1) \cdot v_x \quad (3)$$

In this case, $0 \leq k \leq 1$ represents the shape factor. $v_x$ is the mean slope of a line that would extend between points 11 and 12. Values x1 and y1 represent the coordinates of point P, at which the sections transition into one another. It is clear that overshooting does not occur with the calculated curves with the two sections I and II, while overshooting is marked in the curve plotted according to the related art.

Figure 5:
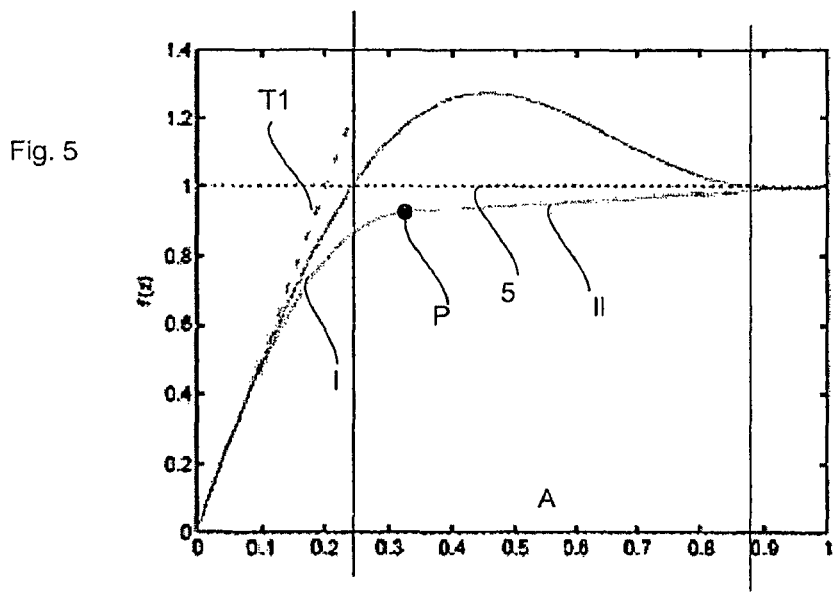
FIG. 5 shows a graph for other basic conditions, which is defined in sections, according to the present invention.

FIG. 5 shows an appropriate adaptation for the third case, in which a high initial speed and a lower end speed are present, i.e., $v_0$>1 and V1$\leq$1. A straight section II is used in this case as well, although this straight section is inserted after polynomial I and not before it. In this case as well, boundary point P between sections I and II may be calculated using the following formulas:

$$v_v = \left(\frac{1}{5}(v_0(2+k) + v_1(3-k))\right) \quad (4)$$

$$x_1 = \frac{1 - v_1}{v_x - v_1} \quad (5)$$

$$y_1 = x_1 \cdot v_x \quad (6)$$

It is clear that the two lower equations (5) and (6) are the inverse equations of the two stated equations (2) and (3), i.e., the only step taken here was to reverse the order of sections I and II.

FIG. 5 shows the resultant curve, which includes no overshooting, while the curve that results according to the related art includes a marked overshoot in region A.

Figure 6:
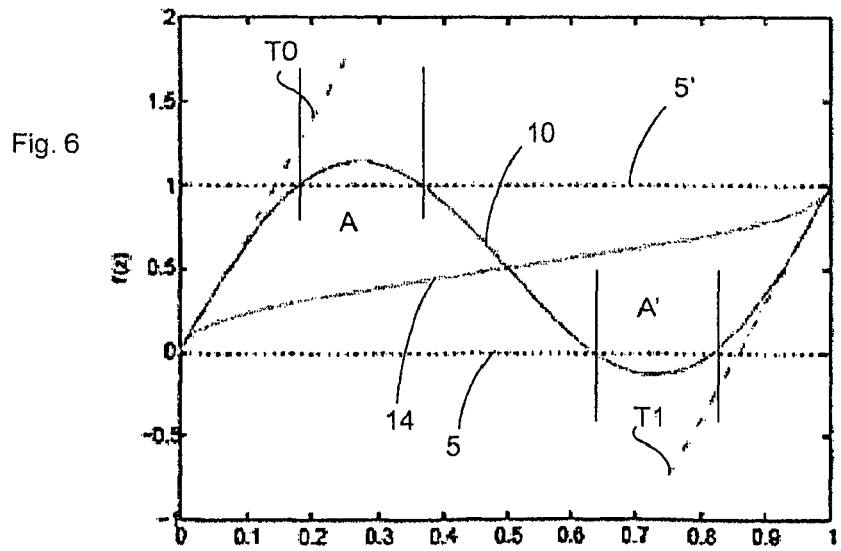
FIG. 6 shows a further possible correction for further basic conditions.

A further case is shown in FIG. 6. In this case, the initial speed—represented by tangent T0—and the final speed—represented by tangent T1—are both greater than 1. In this case, fifth-order polynomial 10 will result in an overshoot, and tolerance limits 5 and 5- will be exceeded in two regions A and A'.

One possibility for counteracting this would be to define the polynomial in three sections, and to select a straight section between two polynomial sections.

In the method illustrated in FIG. 6, the trajectory is depicted on the graph of the polynomial described in the first case (see FIG. 3). More accurately stated, this polynomial depicted in FIG. 1 is reflected around the main diagonal of the normalized coordinate system, and the boundary values for speed are transferred accordingly. Mathematically speaking, an inverse function of this polynomial is therefore created.

The normalized speed of the inverse function is $$v_0' = 1/v_0 \quad (7)$$

and the normalized speed is $$v_1' = 1/v_1$$

The reflected, normalized speed values $v_0'$ and $v_1'$ therefore result as the reciprocals of the normalized boundary values for speed. These normalized boundary values for speed are therefore depicted once more in the overshoot-free range $0 \leq v \leq 1$, which is illustrated in FIG. 6 with reference numeral 14. The plot of the trajectory is therefore calculated from the inverse function of the general, fifth-order polynomial. A calculation of this inverse function is preferably carried out using numeral methods. With the aid of Newton's method, for example, the desired value may be determined to up to 15 decimal places as x or y as the first estimated value after only a few iterations, i.e., this is sufficient for the required machine accuracy. This curve is labeled with reference numeral 12 in FIG. 6.

Speeds $v_0$ and $v_1$ are both 7 in this case.

All features disclosed in the application documents are claimed as being essential to the present invention, provided they are novel compared with the related art, either individually or in combination.

It will be understood that each of the elements described above, or two or more together, may also find a useful application in other types of methods and constructions differing from the types described above.

While the invention has been illustrated and described as embodied in a method and device for controlling a motion sequence of a machine element, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method for controlling a motion sequence of a machine element, comprising the steps of:
  carrying out a control of the motion sequence of the machine element based on a functional relationship between a master shaft and a slave shaft;
  ascertaining the functional relationship with consideration for several basic conditions of the motion sequence;

including in the functional relationship at least one first section, which is defined by an nth-order polynomial, and at least one second section, which is at least partially separated from the first section and is defined by an nth-order polynomial, with "a" being less than "n"; and;

ascertaining values for basic conditions of the motion sequence, comparing the values with one another, and defining a sequence between the sections in response to a result of the comparison.

2. A method for controlling a motion sequence of a machine element as defined in claim 1, further comprising defining the functional relationship in the first section by the nth-order polynomial, with "n" being at least equal to 5.

3. A method for controlling a motion sequence of a machine element as defined in claim 1, further comprising providing a normalized initial speed and a normalized final speed of the machine element with the same mathematical sign.

4. A method for controlling a motion sequence of a machine element as defined in claim 1, further comprising defining the second section by a straight shape.

5. A method for controlling a motion sequence of a machine element as defined in claim 1, further comprising defining the functional relationship from the entire motion sequence by exactly one first section and by exactly one second section.

6. A method for controlling a motion sequence of a machine element as defined in claim 1, further comprising using speeds of the machine element as the basic conditions.

7. A method for controlling a motion sequence of a machine element as defined in claim 1, further comprising depending on values of basic conditions of the motion sequence, defining a transition point at which the sections transition into one another.

8. A method for controlling a motion sequence of a machine element, comprising the steps of:
carrying out a control of the motion sequence of the machine element based on the functional relationship between a master shaft and a slave shaft;
ascertaining the functional relationship with consideration for several basic conditions of the motion sequence;
ascertaining an nth-order polynomial that describes the functional relationship by modifying a few of the basic conditions; and
using an inverse function of the nth-order polynomial to describe the functional relationship.

9. A method for controlling a motion sequence of a machine element as defined in claim 8, wherein said modifying include inverting at least a few of the basic conditions.

10. A method for controlling a motion sequence of a machine element as defined in claim 8, further comprising defining the functional relationship in the first section by the nth-order polynomial, with "n" being at least equal to 5.

11. A method for controlling a motion sequence of a machine element as defined in claim 8, further comprising providing a normalized initial speed and a normalized final speed of the machine element with the same mathematical sign.

12. A method for controlling a motion sequence of a machine element as defined in claim 8, further comprising defining the second section by a straight shape.

13. A method for controlling a motion sequence of a machine element as defined in claim 8, further comprising defining the functional relationship from the entire motion sequence by exactly one first section and by exactly one second section.

14. A method for controlling a motion sequence of a machine element as defined in claim 8, further comprising ascertaining values for basic conditions of the motion sequence, comparing the values with one another, and defining a sequence between the sections in response to a result of the comparison.

15. A method for controlling a motion sequence of a machine element as defined in claim 14, further comprising using speeds of the machine element as the basic conditions.

16. A method for controlling a motion sequence of a machine element as defined in claim 8, further comprising depending on values of basic conditions of the motion sequence, defining a transition point at which the sections transition into one another.

17. A device for controlling a motion sequence of a machine element, comprising:
means for controlling the motion sequence of the machine element based on a functional relationship between a master shaft and a slave shaft, and ascertaining the functional relationship with consideration for several basic conditions of the motion sequence by modifying a few of the basic conditions with the functional relationship including the at least one first section which is defined by an nth-order polynomial, and at least one second section which is separated from the first section and defined by an ath-order polynomial, with "a" being less than "n".

18. A device for controlling a motion sequence of a machine element as defined in claim 17, wherein said means is configured as a processing device at least partially.

* * * * *